United States Patent [19]

Wood et al.

[11] Patent Number: 5,652,288

[45] Date of Patent: *Jul. 29, 1997

[54] WATER DISPERSIBLE POLYISOCYANATE ADHESIVE

[76] Inventors: Benny R. Wood, 187 Tates Estates Rd., Rome, Ga. 30161-9107; Howard Burchett, Jr., 387 Sunset Dr. SE., Calhoun, Ga. 30701

[*] Notice: The term of this patent shall not extend beyond the expiration date of Pat. No. 5,455,293.

[21] Appl. No.: 636,735

[22] Filed: Apr. 19, 1996

Related U.S. Application Data

[63] Continuation-in-part of Ser. No. 423,591, Apr. 17, 1995, abandoned, which is a continuation of Ser. No. 254,317, Jun. 6, 1994, Pat. No. 5,455,293.

[51] Int. Cl.$^6$ .................................................. C08L 75/06
[52] U.S. Cl. .................... 524/271; 524/35; 524/270; 524/272; 524/274; 524/764; 156/331.1
[58] Field of Search .................................. 524/270, 271, 524/35, 272, 274, 764; 156/331.1

[56] References Cited

U.S. PATENT DOCUMENTS

| | | |
|---|---|---|
| 4,412,033 | 10/1983 | LaBelle et al. |
| 4,654,388 | 3/1987 | Lofren. |
| 4,745,026 | 5/1988 | Tsukahara. |
| 4,904,522 | 2/1990 | Markusch. |
| 5,157,074 | 10/1992 | Metzger et al. |
| 5,185,200 | 2/1993 | Tirpak et al. |
| 5,191,012 | 3/1993 | Markusch et al. |
| 5,212,230 | 5/1993 | Tirpak et al. |
| 5,221,710 | 6/1993 | Markusch et al. |
| 5,236,994 | 8/1993 | Markusch et al. |
| 5,258,425 | 11/1993 | Kirby. |
| 5,354,807 | 10/1994 | Dochniak. |
| 5,443,674 | 8/1995 | Fresonke et al. |
| 5,494,960 | 2/1996 | Rolando et al. |
| 5,508,371 | 4/1996 | Werenicz et al. |
| 5,523,344 | 6/1996 | Maksymkiw et al. |

*Primary Examiner*—Patricia A. Short
*Attorney, Agent, or Firm*—Haugen and Nikolai, P.A.

[57] ABSTRACT

A rapid hardening, solvent-free water-based adhesive composition includes an amount of an aqueous latex dispersion of polyester-polyurethane synthetic resin, an amount of rosin acid ester hardener, an amount of a thickener together with an amount of inert filler and an amount of a plasticizer/extender in sufficient water to adjust the percent solids to the desired amount. Optionally, the adhesive composition also includes an amount of polyisocyanate cross-linker to provide additional environmental stability.

8 Claims, No Drawings

WATER DISPERSIBLE POLYISOCYANATE ADHESIVE

This application is a continuation-in-part of application Ser. No. 08/423,591, filed Apr. 17, 1995, now abandoned, which, itself, is a continuation of application Ser. No. 08/254,317, filed Jun. 6, 1994, now U.S. Pat. No. 5,455,293, issued Oct. 3, 1995.

BACKGROUND OF THE INVENTION

1. Field of the Invention

The present invention relates generally to industrial and commercial adhesives and, more particularly, to a solvent-free, water-based polyurethane latex adhesive of relatively rapid cure that may be used advantageously to adhere a wide variety of types of floor covering materials to a variety of flooring materials. The adhesive is solvent-free and relatively water and solvent resistant after cure and may be cross-linked to provide additional environmental resistance as desired, particularly for outdoor installations.

2. Related Art

Presently, the most prevalent, conventional multi-purpose floor covering adhesive materials include a styrene-butadiene latex (SBR) or an acrylic latex material. Conventional premium grade multi-purpose floor covering adhesives using styrene-butadiene latex (SBR) generally include SBR latex, water, alkali (pH modifiers), Kaolin Clays slurry (fillers), aliphatic resins, naphthanic oil (emulsified), freeze-thaw additives, antimicrobial additives and thickeners. The aliphatic resins and naphthanic process oils require emulsifiers, normally surfactants, such as fatty acid, tall oil or laural sulfate based surfactants. These adhesives have been used for a period of time to successfully attach a variety of materials to a variety of floors.

However, SBR-based conventional multi-purpose floor covering adhesives do have certain drawbacks which limit their desirability. While generally described as multi-purpose, the formulas typically must be modified to accommodate each specific type installation, i.e., each distinct floor covering product to be glued. Conventional SBR adhesives exhibit very poor alkali and moisture resistance, making them unsuitable, for example, for outdoor use. These materials also do not exhibit long-term resistance to plasticizer migration when used, for example, in conjunction with polyvinyl chloride materials with dense vinyl backing. SBR latex adhesives characteristically have poor resistance to soaps, surfactants, and solvents (for example, VM&P naphtha, paint thinners, degreasers, and other cleaning liquids). Furthermore, these adhesive materials include naphthanic oils and/or aliphatic resins which must be emulsified, i.e., these materials must be modified with amounts of surfactants (e.g., fatty acids, tall oils or laural sulfate-based surfactants) to provide adequate compound stability and extended storage or shelf life.

The conventional SBR material itself, also, has definite practical installation limitations. The material requires a rather long (24–72 hours) curing time to develop maximum bond strength. In addition, the curing and set-up cycle are further dramatically affected by cure temperature, relative humidity and other environmental conditions. The volatile solvent materials are also undesirable VOC emitters.

Both water dispersible polyisocyanates (polyurethanes) and methods for obtaining stable aqueous dispersions of hydrophobic polyisocyanates through chemical modifications are known. It is also known to utilize external surfactants or additives or high shear mechanical devices to create relatively stable water dispersions of hydrophobic polyisocyanates. Markusch (U.S. Pat. No. 4,904,522), and Tirpak et al (U.S. Pat. No. 5,185,200) have disclosed the preparation and use of aqueous polyisocyanate emulsions for use as binders in the production of fiberglass mats. Aqueous compositions containing encapsulated polyisocyanate which contains unreacted isocyanate groups also are disclosed by Markusch et al in U.S. Pat. No. 5,191,012). Tirpak et all, in U.S. Pat. No. 5,212,230, create an aqueous polyurea dispersion by reacting a concentrated polyisocyanate and a polyamine in an aqueous medium. Another aqueous binder composition containing a trimerization catalyst that provides aqueous compositions which do not require water to cure and which possess good adhesion properties with regard to glass fibers are illustrated by Metzger et al (U.S. Pat. No. 5,157,074). In addition, dispersions of polyisocyanates in aqueous solutions have been used as sealants to prevent the evaporation of water and thereby to improve the cure and strength of green concrete. The material is applied as a dilute aqueous solution and such a system is shown by Markusch et al (U.S. Pat. No. 5,236,994).

Tsukahara et al in U.S. Pat. No. 4,745,026 describe a thermal delayed tack composition in which an adhesive polymer is combined with a particulate solid plasticizer and a tackifier. This material is non-tacky when applied to a surface at ordinary temperature and requires an additional heating or activation step to achieve the tackiness required for the material to operate as an adhesive. Adhesive materials such as this that require an activation step after application as by heat to achieve full adhesive properties are often referred to as two-step adhesives or the use of them as a two-step bonding process. Adhesive materials that achieve full tackiness or adhesion properties and cure as applied from the container without the need for any separate activation step are referred to as single-step adhesives. It will readily be appreciated that a second step requirement, particularly one such as heat activation, for example, presents a serious drawback where the adhesive is used over a large surface such as in the application of floor coverings. The adhesive of the present invention are single-step or one-step adhesives which have an adjustable open time, but which will set up and cure as applied without the need for the application of heat or other additional treatments.

The known art, however, does not suggest the use of water-dispersible polyisocyanate materials as general adhesives; in particular, the art does not suggest that such materials would be of particular value as floor covering adhesives.

It is an object of the present invention to provide a one-step universal, water-based adhesive formulated with a polyisocyanate (polyurethane) latex suitable to adhere many types of materials.

A further object of the invention is to provide a cross-linkable universal, one-step water-based adhesive material suitable for indoor or outdoor use.

Another object of the invention is to provide a cross-linkable universal, water-based, polyurethane latex floor covering adhesive suitable to adhere all types of floor covering materials and suitable for indoor or outdoor use.

Yet another object of the invention is to provide a universal, water-based polyurethane latex floor covering adhesive which is solvent-free and has extremely low VOC emission rendering it environmentally benign for indoor as well as outdoor use.

A still further object of the present invention to provide a universal water-based polyurethane latex floor covering adhesive that can incorporate a wide variety of cross-linking chemical substances which are solvent-free, low VOC emitters.

Yet still another object of the present invention is to provide a water-based universal polyurethane floor covering adhesive that, with cross-linking, is extremely resistant to most common household and industrial solvents and cleaners.

Still another object of the invention is to provide a water-based polyurethane floor covering adhesive that is highly resistant to surface moisture emission or infiltration.

A yet still further object of the invention is to provide a water-based polyurethane floor covering adhesive that is alkali resistant and resistant to plasticizer migration.

Other objects and advantages should become apparent to those skilled in the art upon further consideration of the description and accounts contained in this specification.

SUMMARY OF THE INVENTION

The present invention involves unique, universally applicable water-dispersible polyurethane adhesive formulations which function especially well in fixing all types of floor covering materials in place but whose useful applicability extends far beyond floor coverings to a vast variety of products to be glued. This universality can be successfully accomplished with a few minor formulation modifications, such as the addition or modification of cross-linking agents. The materials have a variety of beneficial attributes making them more desirable than and superior to present products for like uses. The materials have a relatively long, stable shelf life, are solvent-free, and extremely low VOC emitters, making them environmentally advantageous, especially in closed spaces. The material demonstrates excellent green tack and exhibits strong bonding within a few hours of application (final bonding strength reached in as little as 8–10 hours). Formulations in accordance with the invention are further highly alkali resistant (up to at least a pH of 11.0) and plasticizer migration resistant.

In the case of use on porous concrete or wood floors or other permeable surfaces in which surface moisture emission or infiltration occurs, the material can be used as a primer or sealcoat in addition to being used to bond the flooring materials. When it is used as a primer or sealcoat, the material will resist surface moisture emission rates as high as 5.5–6.0 pounds per 1000 square feet per 24 hours. Thus, the material can be used to seal high-seepage floors, for example, using a two-coat process in which a first coat is applied and allowed to cure; and thereafter, a second coat is applied to bond the flooring material in a one-step bonding operation.

Certain properties of the water-dispersible universal adhesive of the invention can be modified using cross-linkers in the formula, if desired. The cross-linkers further decrease bonding time and greatly increase the water resistance of the final bond, which is especially desirable for outdoor use. The cured, cross-linked material further is also extremely resistant to most common household and industrial solvents and cleaners (for example, VM&P naphtha, gasoline, paint thinners, degreasers, cleaning liquids and the like) and exhibits good heat resistance (stable to 180° F., 82° C.).

The preferred formulation includes a combination of water dispersible polyisocyanate latex (polyurethane latex), an amount of a resin hardening agent (rosin acid ester dispersion), an amount of polyacrylate thickening agent combined in an amount of water to give the desired percent solids. The formulas typically also include polymer latex modifiers, inert filler additives and plasticizer/extender modifiers. Cross-linking agents such as aliphatic polyisocyanates or poly-functional water dispersible isocyanates may be utilized in minor amounts if cross-linking is desired in the particular application. A preferred (weight) formulation range appears next below.

| PREFERRED FORMULATION RANGE | |
|---|---|
| Polyester-Polyurethane Latex | 80–100 parts |
| Polymer Latex Modifiers (such as Acrylics, Styrene-butadiene, Carboxylated Styrene-butadiene, Nitriles, Neoprenes, Ethylene Vinyl Acetates) | 0–20 parts |
| Inert Filler Additives (Kaolins, Calcium Carbonates, Barium Sulfates, Silicate spheres, Ground reprocessed rubber, Cellulose, synthetic fiber (reclaimed) | 0–160 parts |
| Plasticizer/Extender Modifiers (paraffinics, naphthenics, phthalates) | 0–15 parts |
| Rosin Acid Ester | 25–70 parts |
| Polyacrylate (thickener) | 1–5 parts |
| Water (adjustment for solids) | 50–70 percent solids |
| Polyisocyanate Cross-linker (aliphatic polyisocyanate cross-linker) | 2–10 parts |

The typical open time is about 1 to 1½ hours and the setup time is 3–4 hours. Wet adhesion diminishes with open time for cross-linked material and spreading within two hours is preferred.

DETAILED DESCRIPTION

The polyurethane latex adhesive of the present invention contemplates wide usage as a universal water-based adhesive. While other uses, including that of construction adhesive are contemplated, in the detailed description of the specification, is directed to using the material to adhere any type of floor covering material/floor combination. Optional cross-linking agents impart greater solvent resistance and environmental stability to accommodate more severe application conditions. Types of carpet materials typically include Actionback (a trademark of Patchoque-Plymouth Division of Amoco Fabrics), jute-backed; latex or urethane unitary structure; carpet tiles (polyvinyl chloride, urethane or polyurethane or polypropylene) hot-melt secondaries, e.g., Unibond (a trademark of Burlington Industries Lees Carpets), carpets with attached cushion backings or urethane or rubber polymer backings and in direct or double glued systems (pad to floor and carpet to pad) also adhere well. All types of sheet vinyl materials may be fixed including those that are mineral, paper or felt-backed; cushion vinyls (full spread or perimeter installations); pure vinyl (full spread); linoleums; and pure vinyl or vinyl composition tiles. Other floor coverings contemplated include rubber radial tiles, ceramic tiles, vinyl planks, laminated wood parquet and laminated wood plank. Installation may be indoors or, with cross-linking, outdoors or under more stressful environments.

Not only are the adhesive qualities of the formulations in accordance with the present invention superior to conventional adhesives such as those made with styrene-butadiene latex (SBR) and/or acrylic latex with respect to adhesion and environmental stability, the water-based materials are extremely stable in storage, much more convenient to work with, and contain no volatile solvents or other chemical ingredients which emit undesirable vapors. The adhesives are one-step bonders and so require no separate activation step to fully cure. Bonding time is reduced (8–10 hours) so that carpet can be installed "overnight" and used the next morning. Furthermore, in addition to exhibiting excellent bonding characteristics, the adhesives of the invention are also excellent sealant for moisture emitting surfaces.

The general formulation of the adhesive of the invention includes an amount of a polyester-polyisocyanate (polyurethane) in aqueous dispersion combined with an amount of rosin acid ester hardening agent in the form of an aqueous dispersion of synthetic resin, an amount of a thickening agent, typically polyacrylate, and sufficient water to yield the desired percent solids. The material normally includes an amount of a polymer latex modifier, inert filler additive and a plasticizer/extender modifier. In addition, the formulation typically includes an amount of polyisocyanate cross-linking material to cross-link the polyester/polyisocyanate resin material.

The cross-linking agent is also a water-dispersible polyisocyanate preferably in the form of an aliphatic polyisocyanate. One successfully used in the formula of the invention was based on a 1,6-Hexamethylene Diisocyanate (HDI), also known as polymeric hexamethylene diisocyanate, such products are available from the Polystar Rubber Division of Miles Inc. in Pittsburgh, Pa., identified as "Desmodur DA" or "R 255".

The formula also contains significant amounts of rosin acid ester hardening agents in the form of an aqueous dispersion of rosin ester, also known as a synthetic resin dispersion. An example of this is known as Tacolyn 1085 or Hercules Res A-2340A (trademarks of Hercules Incorporated). In addition, the preferred adhesive formulation of the invention further contains varying amounts of polymer latex modifiers, inert filler additives and plasticizer/extender modifier compounds. The polymer latex modifiers include acrylics, styrene-butadiene, carboxylated styrene-butadiene, nitriles, neoprenes, ethylene vinyl acetates, and the like.

Inert filler additives are also utilized, such as calcium carbonate in the form of whiting material, one of which is known as Marble White 199 available from Filler Products, Inc., Chatsworth, Ga. That material is typically a minimum of 95% carbonates, including calcium (Ca) and magnesium (Mg), of which the magnesium carbonate is typically 20%–30%. The balance of the materials includes silica ($SiO_2$), 1–1.5% and iron and aluminum oxides ($Fe_2O_3$ and $Al_2O_3$), 1–1.5%. The material is typically fine enough to pass –325 mesh. Other inert filler additives include Kaolin (hydrated aluminum silicate or china clay). This material is also typically –325 mesh and is available as spray-dried beads or in slurry form. Other useful inert filler additives include barium sulfates, silicate spheres, ground reprocessed rubber, cellulose, synthetic fiber (reclaimed) and any other materials having the chemical compatibility and physical properties desired.

The material also typically contains some plasticizer/extender modifying material such as paraffinic, naphthenics, and phthalates. These generally affect the spreadability of the material.

According to the present invention, the following represents an approximate weight percentage composition range of the preferred combination.

| | |
|---|---|
| Polyester Polyurethane Latex | 80–100 parts |
| Polymer Latex Modifiers (such as Acrylics, Styrene-butadiene, Carboxylated Styrene-butadiene, Nitriles, Neoprenes, Ethylene Vinyl Acetates) | 0–20 parts |
| Inert Filler Additives (Kaolins, Calcium Carbonates, Barium Sulfates, Silicate spheres, Ground reprocessed rubber, Cellulose, synthetic fiber (reclaimed) | 0–160 parts |
| Plasticizer/Extender Modifiers (paraffinics, naphthenics, phthalates) | 0–15 parts |
| Rosin Acid Ester | 25–70 parts |
| Polyacrylate (thickener) | 1–5 parts |
| Water (adjustment for solids) | 50–70 percent solids |
| Polyisocyanate Cross-linker (aliphatic polyisocyanate cross-linker) | 2–10 parts |

EXAMPLE I

Based on dry weight, a particularly useful formula included:

| | |
|---|---|
| 100 parts by weight polyester-polyurethane (synthetic resin dispersion) latex | 100 parts |
| FPI Marble White 199 | 37.5 parts |
| Kaolin | 37.5 parts |
| Polyacrylate copolymer, ammonium salt | 1.75 parts. |

This material, made up in a smooth aqueous blend exhibits a pH of 8–9, viscosity at 20° C. #7 of 15–20 and weighs 9.5–10.5 pounds per gallon. For water resistance, approximately 7% aliphatic polyisocyanate (1,6-hexamethylene diisocyanate based polyisocyanate) cross-linking agent or a poly-functional water dispersible isocyanate may be added for modified curing properties and to provide additional water and solvent resistance.

Once mixed, the pot-life of the material with the cross-linking agent is up to 12 hours; however, wet adhesion and tack diminish with the length of open time of mixtures with cross-linking agent added. The best results are obtained if the material is spread within a two-hour period. The set time is approximately 3–4 hours and maximum bonding strength can be reached as early as 8–10 hours (4–6 hours with cross-linker) after application.

The thickener material adds body and spreadability to the material and is typically an acrylic polymer in the form of a polyacrylate copolymer, ammonium salt, such as "Alcogum Arm" available from Alco Chemical Division of National Starch and Chemical Company, Chattanooga, Tenn.

The polyester-polyisocyanate (polyurethane) aqueous dispersion is of a class of dispersible materials exemplified by products such as Dispercoll UE-1409 available from Miles Inc., Polysar Rubber Division, Pittsburgh, Pa., available in liquid form. This is the principal resin material.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Variations of the composition within the parameters of the General Formula adjust physical properties to meet specific installation specifications and requirements where advantageous, e.g., installation of rubber radial tiles, hardwood (laminated) plank or parquet and ceramic tiles.

While the aqueous dispersion formulae are freeze/thaw sensitive, compatible freeze point depressive materials may be incorporated where below freezing temperatures are likely to be encountered. One material that has been used successfully to prevent freezing and to extend and lower the curing temperature is urea, also a chemically compatible, water soluble and environmentally benign material.

The adhesive material of the invention has been found to provide complete resistance to alkali or caustic materials through at least pH 11.0. A further attribute is the moisture resistance of the material. This applies both to subsurface moisture and moisture associated with flooding, cleaning processes or spillage. Present subsurface moisture resistant materials are limited to resisting a maximum of about 3.0 pounds per 1000 square feet per 24 hours (as determined by the Rubber Manufacturers Association Calcium Chloride Test Method). The adhesive preparation of the present invention used as a flooring primer or sealcoating layer on concrete, wood or other porous or semi-porous material has been observed to prevent subsurface moisture penetration or emission where the emission potential is as high as 5.5–6.0 pounds water per 1000 square feet per 24 hours.

When the material is used as a sealcoating, one layer is applied to the bare floor and allowed to cure. Thereafter, a second application is used as the bonding material to bond the floor covering to the subfloor.

We claim:

1. A one-step water-based liquid adhesive composition comprising an amount of an aqueous latex dispersion of a preformed polyester-polyurethane synthetic polymer resin with an amount of a rosin acid ester hardener and an amount of a thickener in sufficient water to adjust the percent solids to a predetermined amount, the adhesive bonding properties of said composition being fully activated.

2. The adhesive composition of claim 1 further comprising an amount of inert filler and an amount of a plasticizer/extender.

3. The adhesive composition of claim 1 further comprising an amount of polyisocyanate cross-linker.

4. The adhesive composition of claim 2 further comprising an amount of polyisocyanate cross-linker.

5. The adhesive composition of claim 1 further comprising one or more polymer latex modifiers selected from the group consisting of acrylics, styrene-butadiene, carboxylated styrene-butadiene, nitriles, neoprenes, ethylene and vinyl acetates.

6. The adhesive composition of claim 2 wherein the inert filler additives are selected from the group consisting of Kaolins, calcium carbonates, barium sulfates, silicate spheres, ground reprocessed rubber, cellulose, and reclaimed synthetic fiber reclaimed.

7. The adhesive composition of claim 2 wherein the plasticizer/extender modifiers are selected from the group consisting of paraffinics, naphthenics and phthalates.

8. The method of securing materials to substrates susceptible to moisture infiltration comprising the steps of:

(a) applying a sealing layer of a water-based liquid adhesive composition on said substrate, said composition comprising an amount of an aqueous latex dispersion of a preformed polyester-polyurethane synthetic polymer resin with an amount of rosin acid ester hardener and an amount of a thickener in sufficient water to adjust the percent solids to a predetermined amount;

(b) allowing said adhesive sealing layer to cure at ambient temperature;

(c) applying a second layer of said adhesive composition between material to be secured to said substrate and said sealing layer; and (d) allowing said adhesive layer to cure at ambient temperature.

* * * * *